(12) United States Patent
Kikuchi

(10) Patent No.: US 10,509,512 B2
(45) Date of Patent: Dec. 17, 2019

(54) OPERATION INPUT DEVICE AND IMAGE PROCESSING SYSTEM

(71) Applicant: Wacom Co., Ltd., Saitama (JP)

(72) Inventor: Ryoichi Kikuchi, Chiba (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 15/826,153

(22) Filed: Nov. 29, 2017

(65) Prior Publication Data

US 2018/0181260 A1  Jun. 28, 2018

(30) Foreign Application Priority Data

Dec. 26, 2016  (JP) ................................. 2016-251108

(51) Int. Cl.
*G06F 3/041* (2006.01)
*G06F 3/042* (2006.01)

(52) U.S. Cl.
CPC .......... *G06F 3/0425* (2013.01); *G06F 3/0414* (2013.01); *G06F 2203/04101* (2013.01); *G06F 2203/04102* (2013.01); *G06F 2203/04103* (2013.01); *G06F 2203/04106* (2013.01)

(58) Field of Classification Search
None
See application file for complete search history.

(56) References Cited

U.S. PATENT DOCUMENTS

2012/0303839 A1\* 11/2012 Jackson ................. G06F 3/011
   710/15
2018/0095578 A1\* 4/2018 Sah ....................... H03K 17/965

FOREIGN PATENT DOCUMENTS

JP  2014-182717 A  9/2014

\* cited by examiner

*Primary Examiner* — Joseph R Haley
(74) *Attorney, Agent, or Firm* — Seed IP Law Group LLP

(57) ABSTRACT

An input device includes: an operation input panel having a front surface and a back surface, wherein the operation input panel, in operation, receives external forces on the front surface and the back surface as operation inputs and is elastically displaced by the external forces; a sensor which, in operation, detects displacements of the operation surface caused by the external forces; and a signal transmission circuit which, in operation, transmits signals corresponding to the displacements detected by the sensor. The operation inputs received by the input device may cause visual, three-dimensional deformations to object images displayed on a display screen.

16 Claims, 9 Drawing Sheets

FIG.12
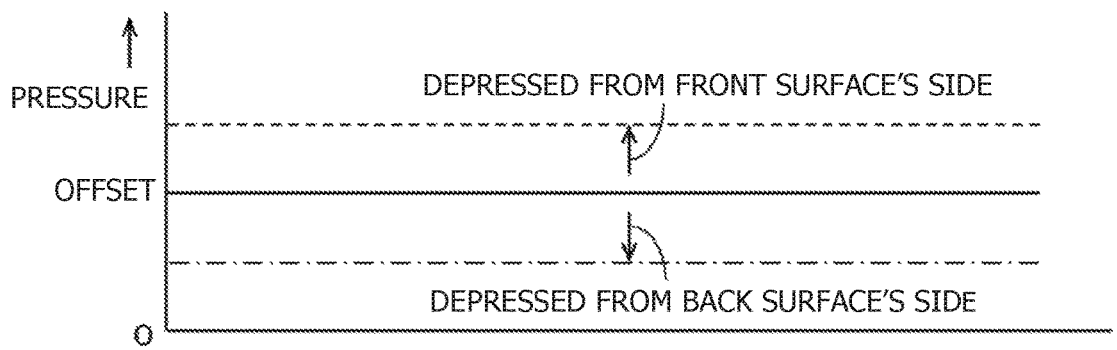
FIG.13A      FIG.13B      FIG.13C
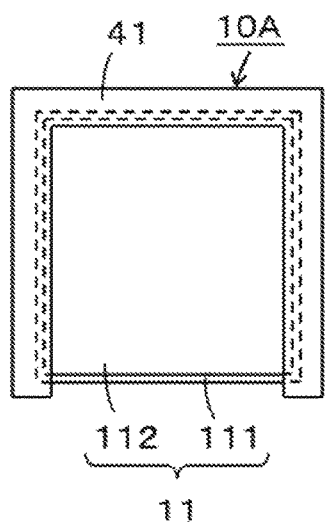 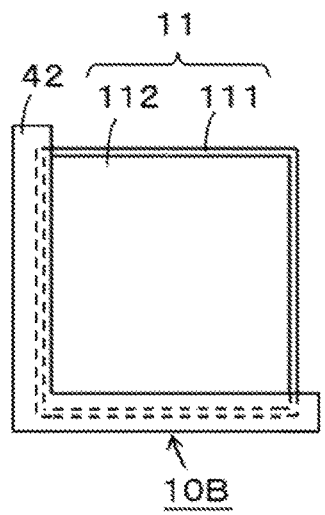 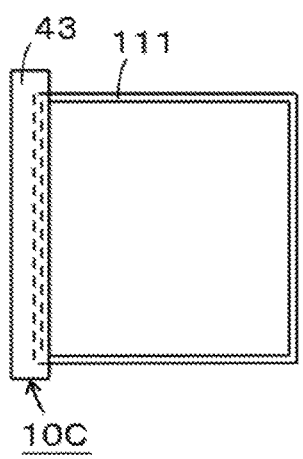
FIG.14
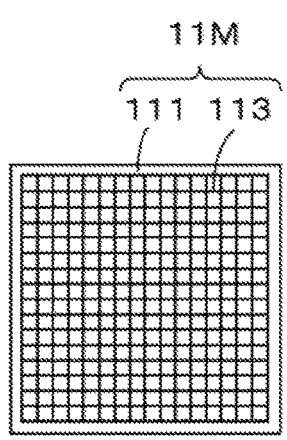

OPERATION INPUT DEVICE AND IMAGE PROCESSING SYSTEM

BACKGROUND

Technical Field

The present disclosure relates to an operation input device that receives operation inputs for visually and three-dimensionally deforming an object image (target object image) displayed on a display screen, and to an image processing system using the operation input device.

Description of the Related Art

There have conventionally been known technologies for visually causing three-dimensional deformation, such as hollowing or bulging a part, to an object image displayed on a display screen of a display device. For example, a coordinate input device for professionals like graphic designers enables the three-dimensional deformation of the object image by having the operator use both hands to make an operation input. The operator selects and operates a "hollow" function button or a "bulge" function button with the left hand while specifying a position on the object image on the display screen of the coordinate input device with a finger of the right hand or an electronic pen held in the right hand, for example, by which the three-dimensional deformation such as hollowing or bulging of the object image can be made at the specified position.

Patent Document 1 (Japanese Patent Laid-Open No. 2014-182717) discloses an information processing device in which a touch panel and a pressure sensor unit are overlaid on each other on a front side of a display unit such as a liquid crystal display (LCD) while a touch panel and a pressure sensor unit are overlaid on each other also on a back side of the display unit. The information processing device of Patent Document 1 detects the pressure of the depressing operation on the touch panel with the pressure sensor and causes visual and three-dimensional deformation corresponding to the detected pressure to the object image displayed on the display screen of the display unit.

Patent Document 1 also discloses visual and three-dimensional twisting deformation of the object image that is possible on the information processing device by performing an operation of simultaneously touching the touch panels on the front and back sides of the display unit with fingers and moving the touch position on one side.

BRIEF SUMMARY

The aforementioned coordinate input device for professionals requires skill to cause the visual and three-dimensional deformation intended by the user to the object image displayed on the display screen by using both hands. Thus, it is difficult for an average user as a non-expert to cause intended deformation with ease. This is not only because the operator has to use both hands but also because the operator, being incapable of haptically sensing the deformation of the object image in the input operation on the coordinate input device, cannot perform an intuitive deformation operation and has to carry out the deformation operation while visually checking the deformation of the object image on the display screen.

In the case of Patent Document 1, a deformation operation like hollowing or bulging a part of the object image can be performed with one hand. However, also with the information processing device of Patent Document 1, the operator is incapable of haptically sensing the deformation of the object image, and thus the operator cannot perform an intuitive deformation operation and has to carry out the deformation operation while visually checking the deformation of the object image on the display screen.

The object of the present disclosure is to provide an operation input device configured to resolve the above-described problem.

To resolve the above-described problem, the present disclosure provides an input device that receives operation inputs that cause visual three-dimensional deformations to an object image displayed on a display screen. The input device includes: an operation input panel having a front surface and a back surface, wherein the operation input panel, in operation, receives external forces as the operation inputs and is elastically displaced by the external forces; a sensor which, in operation, detects displacements of the operation input panel caused by the external forces; and a signal transmission circuit which, in operation, transmits signals corresponding to the displacements detected by the sensor.

In the input device according to the present disclosure configured as above, the operation input panel is elastically displaced upon receiving the external forces applied by an operating piece such as a finger. Further, the operation input panel is configured to receive the operation inputs from both the front surface and the back surface.

The displacements of the operation input panel are detected by the sensor. Then, the signals corresponding to the displacements detected by the sensor are transmitted by the signal transmission circuit to an external device such as a display device.

Accordingly, the operator can operate the input device by applying a force to the front surface as an operation input for hollowing a part of the object image, and can operate the input device by applying a force to the back surface as an operation input for bulging a part of the object image. Thus, the operator can apply the external forces to the operation input panel in such a manner, and thereby intuitively make operation inputs for hollowing a part of the object image, bulging a part of the object image, etc. while haptically sensing the displacements of the operation input panel corresponding to the external force.

According to the present disclosure, the operator can make operation inputs to both the front surface and the back surface of the operation input panel while haptically sensing the displacements of the operation input panel. Therefore, intuitive operation inputs are made possible and even operators unaccustomed to performing such input operations are enabled to perform the operations with ease.

BRIEF DESCRIPTION OF THE DRAWINGS

FIG. 12 is a diagram for explaining the example depicted in FIGS. 11A and 11B;

FIGS. 13A to 13C are diagrams depicting modifications of part of the operation input device according to the first embodiment of the present disclosure;

FIG. 14 is a diagram depicting a modification of part of the operation input device according to the first embodiment of the present disclosure;

DETAILED DESCRIPTION

Some embodiments of an operation input device according to the present disclosure will be described below with reference to drawings.

First Embodiment

Figure 1:
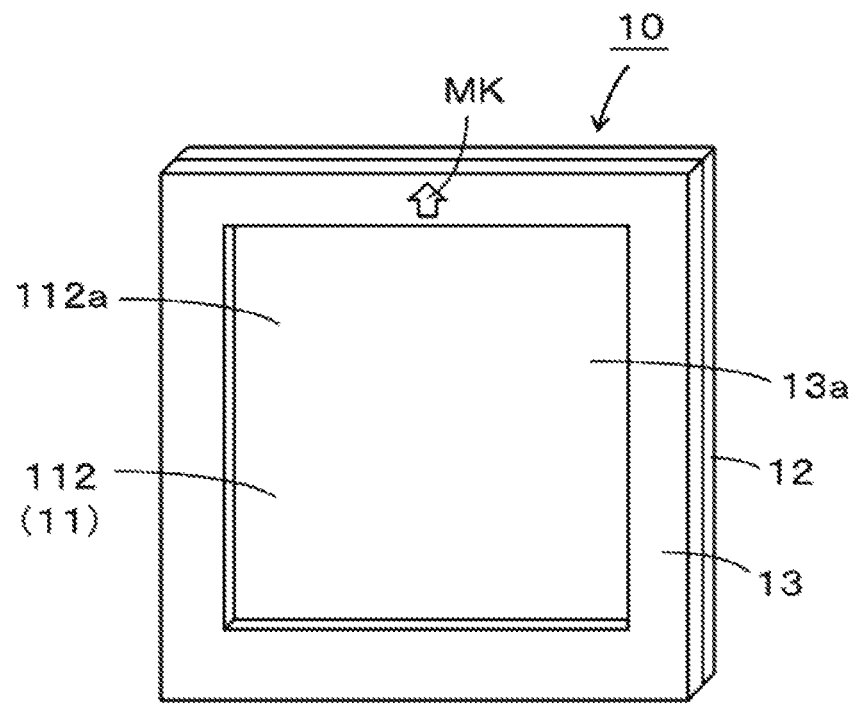
FIG. 1 is a diagram depicting the external appearance of an operation input device according to a first embodiment of the present disclosure.
Figure 2:
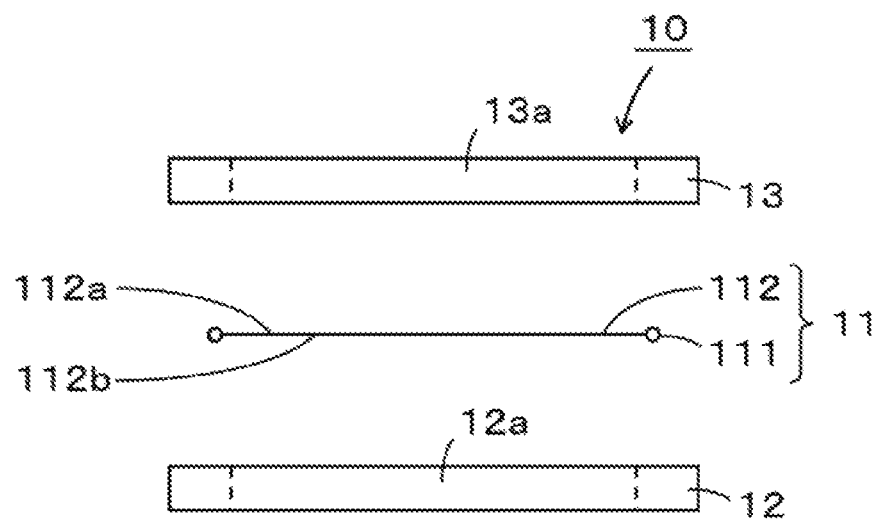
FIG. 2 is an exploded configuration diagram of the operation input device according to the first embodiment of the present disclosure.

FIGS. 1 to 10 are diagrams for explaining an example of the configuration of an operation input device according to a first embodiment of the present disclosure. FIGS. 1 and 2 are diagrams for explaining the general outline of the operation input device 10 according to the first embodiment. FIG. 1 is a diagram depicting the external appearance of the operation input device 10 according to the first embodiment. FIG. 2 is a diagram depicting principal components of the operation input device 10 according to the first embodiment in a disassembled state. Incidentally, FIG. 2 depicts the operation input device 10 as viewed from the side.

As depicted in FIGS. 1 and 2, the operation input device 10 according to the first embodiment includes an operation input panel 11, an outer frame base part 12 and an outer frame cover part 13. The outer frame base part 12 and the outer frame cover part 13 constitute an outer frame of the operation input device 10. The operation input panel 11 is held between the outer frame base part 12 and the outer frame cover part 13. In the first embodiment, the operation input panel 11 is not pressed and sandwiched between the outer frame base part 12 and the outer frame cover part 13 but a peripheral part of the operation input panel 11 is arranged in a space that is formed between the outer frame base part 12 and the outer frame cover part 13 to communicate with through holes 12a and 13a as will be explained later. Accordingly, the operation input panel 11 is held in a state of being loosely fitted without being fixed by the outer frame base part 12 and the outer frame cover part 13.

As depicted in FIGS. 1 and 2, the outer frame base part 12 and the outer frame cover part 13 have the same size and shape. In this example, quadrangular through holes 12a and 13a of the same size are formed in flat plates each having a quadrangular outer shape. Further, as depicted in FIG. 2, the outer frame base part 12 and the outer frame cover part 13 are stacked up so that their quadrangular through holes 12a and 13a positionally coincide with each other to form one through hole and so as to sandwich the operation input panel 11, and are fixed together by means of adhesive bonding, for example.

Figure 3A:
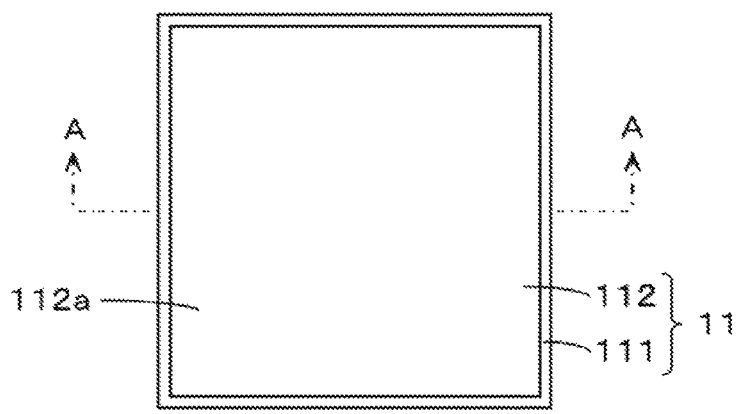
FIGS. 3A and 3B are diagrams depicting an example of an operation input panel included in the operation input device according to the first embodiment of present disclosure.
Figure 3B:
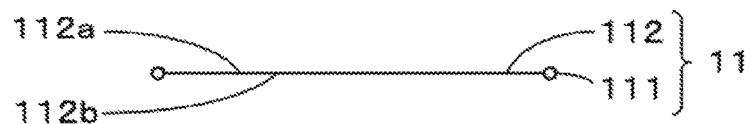

As depicted in FIG. 3A, the operation input panel 11 in the first embodiment is formed by fixing a sheet-like member 112 having elasticity to an operation surface frame member (hereinafter referred to simply as a "frame member") 111 in a quadrangular shape made of an elastic material. FIG. 3B is a cross-sectional view taken along the line A-A in FIG. 3A.

In this example, the frame member 111 in the quadrangular shape is formed of a wire member that is made of metal having elasticity and electrical conductivity.

In this case, the frame member 111 formed of the wire member made of metal is configured to expose its metallic part in this example. Specifically, the sheet-like member 112 is fixed to the frame member 111 to inscribe the frame member 111. Further, as depicted in FIG. 2, the quadrangular frame member 111 of the operation input panel 11 is formed in a quadrangular shape that is larger than the quadrangular through holes 12a and 13a of the outer frame base part 12 and the outer frame cover part 13 and smaller than the outer-circumferential quadrangles of the outer frame base part 12 and the outer frame cover part 13.

Accordingly, the operation input panel 11 is not detached from the through holes 12a and 13a even in the state in which the operation input panel 11 is loosely fitted in the space formed between the outer frame base part 12 and the outer frame cover part 13 to communicate with the through holes 12a and 13a. As is seen in FIG. 2, the sheet-like member 112 of the operation input panel 11 is arranged to expose its front surface 112a's side to the outer frame cover part 13's through hole 13aΣs side and to expose its back surface 112b's side to the outer frame base part 12's through hole 12a's side. These parts of the sheet-like member 112 exposed through the through holes 12a and 13a constitute substantial operation surfaces.

The sheet-like member 112 is formed of a rubber sheet in this example. Since the sheet-like member 112 has elasticity, upon receiving external force (operation input by the operator) applied in a direction crossing its sheet surface, the sheet-like member 112 is displaced elastically to be protruded in the application direction of the external force (see FIG. 4A to 4D). Further, since the sheet-like member 112 is fixed to the frame member 111 having elasticity in the first embodiment, the frame member 111 is also displaced elastically according to the elastic displacement of the sheet-like member 112.

In this case, as depicted in FIG. 4A to 4D, the shape of the elastic displacement of the sheet-like member 112's sheet surface changes depending on the magnitude and the application position of the external force applied in the direction crossing the sheet-like member 112's sheet surface, and the frame member 111 undergoes elastic displacement according to the shape of the elastic displacement of the sheet-like member 112's sheet surface.

Figure 4A:
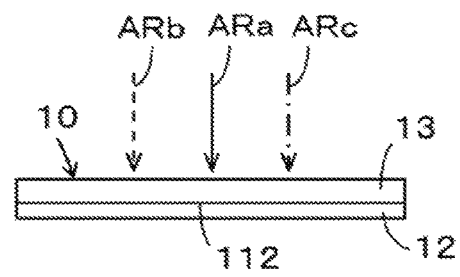
FIGS. 4A to 4D are diagrams used for explaining part of the operation input device according to the first embodiment of the present disclosure.
Figure 4B:
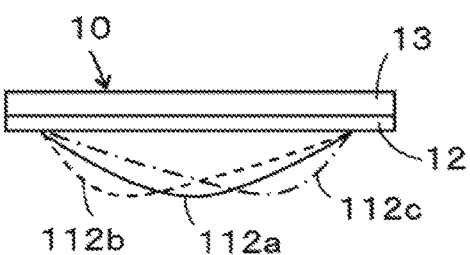

Specifically, in the operation input device 10 of this embodiment, when the external force is applied to the sheet-like member 112 of the operation input panel 11 from the outer frame cover part 13's side in a direction and at a position indicated by the arrow ARa, ARb or ARc as depicted in FIG. 4A, the sheet-like member 112 is displaced elastically to be protruded to the outer frame base part 12's side as depicted in FIG. 4B. The shape of the elastic displacement is a protruding shape corresponding to the magnitude and the application position of the external force, in which the displacement hits the maximum at the application position.

Figure 4C:
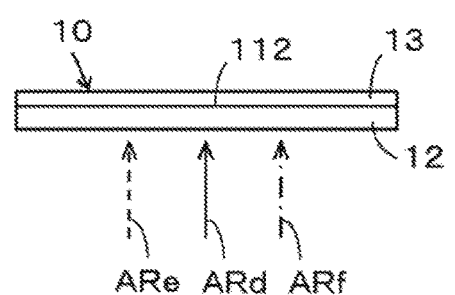
Figure 4D:
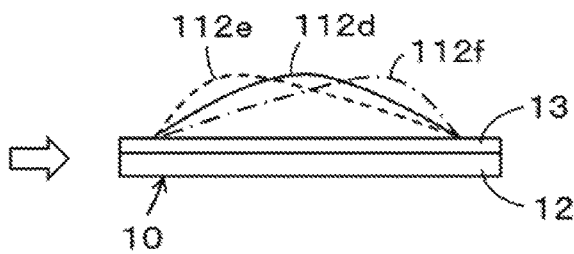

When the external force is applied to the sheet-like member 112 of the operation input panel 11 from the outer frame base part 12's side in a direction and at a position indicated by the arrow ARd, ARe or ARf as depicted in FIG. 4C, the sheet-like member 112 is displaced elastically to be protruded to the outer frame cover part 13's side as depicted in FIG. 4D. The shape of the elastic displacement is a protruding shape corresponding to the magnitude and the application position of the external force, in which the displacement hits the maximum at the application position.

Specifically, when the external force is applied at the position indicated by the solid line arrow ARa in FIG. 4A, the sheet-like member 112 exhibits elastic displacement in a protruding shape corresponding to the magnitude and the application position of the external force like the shape indicated by the solid line 112a in FIG. 4B. When the external force is applied at the position indicated by the broken line arrow ARb in FIG. 4A, the sheet-like member 112 exhibits elastic displacement in a protruding shape corresponding to the magnitude and the application position of the external force like the shape indicated by the broken line 112b in FIG. 4B. When the external force is applied at the position indicated by the chain line arrow ARc in FIG. 4A, the sheet-like member 112 exhibits elastic displacement in a protruding shape corresponding to the magnitude and the application position of the external force like the shape indicated by the chain line 112c in FIG. 4B. Although not illustrated in FIGS. 4A to 4D, the frame member 111 of the operation input panel 11 undergoes elastic deformation according to the shape of the elastic deformation of the sheet-like member 112.

When the external force is applied at the position indicated by the solid line arrow ARd in FIG. 4C, the sheet-like member 112 exhibits elastic displacement in a protruding shape corresponding to the magnitude and the application position of the external force like the shape indicated by the solid line 112d in FIG. 4D. When the external force is applied at the position indicated by the broken line arrow ARe in FIG. 4C, the sheet-like member 112 exhibits elastic displacement in a protruding shape corresponding to the magnitude and the application position of the external force like the shape indicated by the broken line 112e in FIG. 4D. When the external force is applied at the position indicated by the chain line arrow ARf in FIG. 4C, the sheet-like member 112 exhibits elastic displacement in a protruding shape corresponding to the magnitude and the application position of the external force like the shape indicated by the chain line 112f in FIG. 4D.

Although not illustrated in FIGS. 4A to 4D, the frame member 111 of the operation input panel 11 undergoes elastic deformation according to the shape of the elastic deformation of the sheet-like member 112. In the first embodiment, the position and the magnitude of the external force (operation input by the operator) applied to the sheet-like member 112 are detected by detecting the elastic displacement of the frame member 111 according to the elastic displacement of the sheet-like member 112. In the first embodiment, a sensor for detecting the elastic displacement of the frame member 111 of the operation input panel 11 is provided on the outer frame base part 12. The outer frame base part 12 is also provided with a signal transmission circuit that generates an output signal of the operation input device from the detection output of the sensor and transmits the output signal to the outside.

Figure 5A:
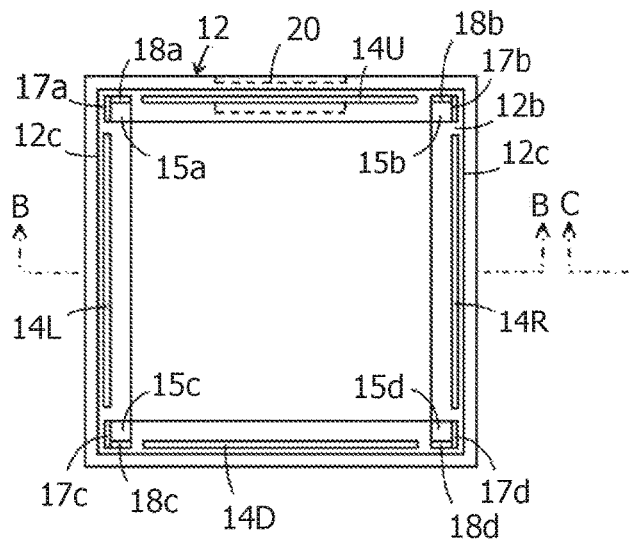
FIGS. 5A to 5D are diagrams depicting a configuration example of part of the operation input device according to the first embodiment of the present disclosure.
Figure 5C:
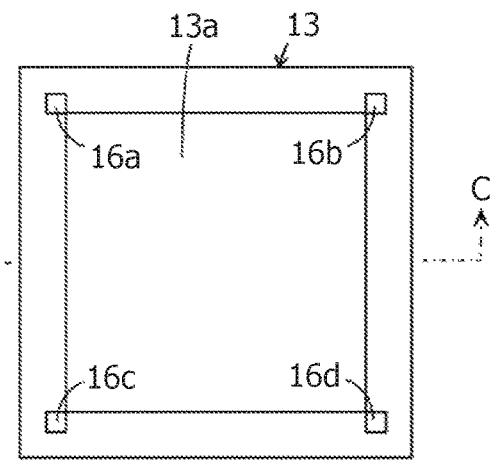
Figure 5B:
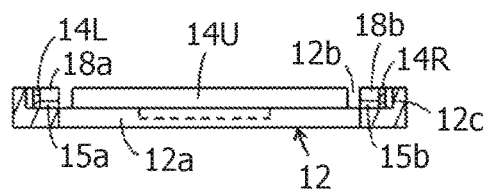
Figure 5D:
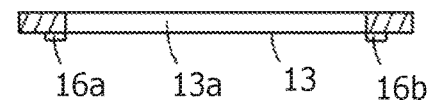

Next, an example of the configuration of the outer frame base part 12 and the outer frame cover part 13 will be described below. FIG. 5A is a diagram depicting the outer frame base part 12 as viewed from a side of a surface allowing the operation input panel 11 to exist. FIG. 5B is a cross-sectional view of the outer frame base part 12 taken along the line B-B in FIG. 5A. FIG. 5C is a diagram depicting the outer frame cover part 13 as viewed from a side of a surface allowing the operation input panel 11 to exist. FIG. 5D is a cross-sectional view of the outer frame cover part 13 taken along the line C-C in FIG. 5C.

In the first embodiment, step parts 12c for forming a recessed part 12b for storing the operation input panel 11 are formed in the outer frame base part 12. In the first embodiment, the recessed part 12b is formed in a quadrangular shape larger than the quadrangular operation input panel 11. In the recessed part 12b, four displacement sensors 14U, 14D, 14L and 14R are arranged to detect the elastic displacement of the frame member 111 of the operation input panel 11 according to the elastic displacement of the sheet-like member 112. The displacement sensors 14U, 14D, 14L and 14R are arranged at positions corresponding to the four sides of the quadrangular frame member 111 of the operation input panel 11 stored in the recessed part 12b.

Figure 6A:
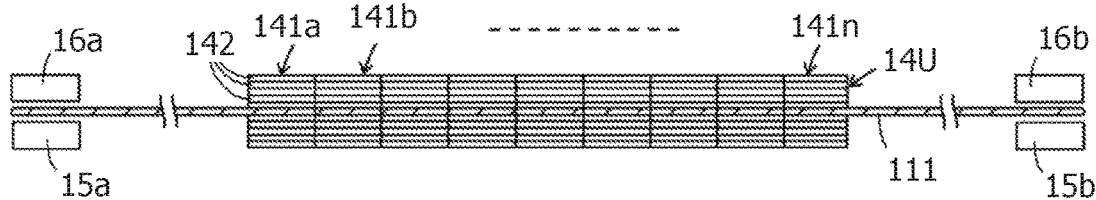
FIGS. 6A to 6C are diagrams for explaining the operation of part of the operation input device according to the first embodiment of the present disclosure.
Figure 6B:
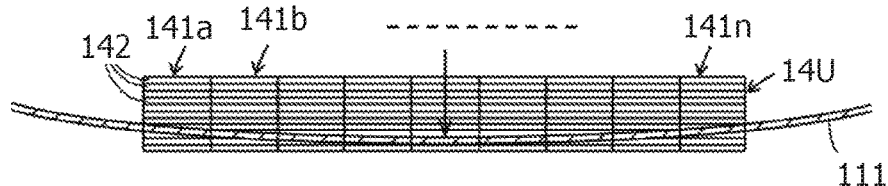
Figure 6C:
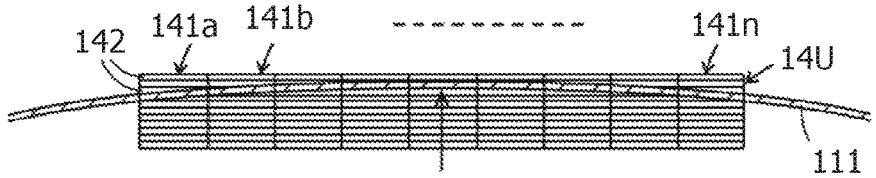

The four displacement sensors 14U, 14D, 14L and 14R have the same configuration. FIGS. 6A to 6C depict an example of the configuration of the displacement sensor 14U as a representative. Specifically, as depicted in FIG. 6A, the displacement sensor 14U includes a plurality of sub-units 141a, 141b, . . . , and 141n as divided units arranged along a side of the frame member 111 of the operation input panel 11. The plurality of sub-units 141a, 141b, . . . , and 141n are units for detecting which position in their arrangement direction is the application position of the external force.

Each sub-unit 141a, 141b, . . . , 141n of the displacement sensor 14U is formed by stacking up a plurality of metal sensors 142 in a height direction (direction orthogonal to the sheet-like member 112 of the operation input panel 11). Each metal sensor 142 is formed of a proximity sensor or a contact sensor, for example, and detects the metallic frame member 111 of the operation input panel 11. The plurality of stacked metal sensors 142 are sensors for detecting the magnitude of the external force applied to the sheet-like member 112.

Incidentally, in this embodiment, height adjustment stage parts 15a, 15b, 15c and 15d are provided at the four corners of the recessed part 12b of the outer frame base part 12 as depicted in FIG. 6A so that the height position of the frame member 111 of the operation input panel 11 equals central positions of the displacement sensors 14U, 14D, 14L and 14R in the height direction. The outer frame cover part 13 is provided with projection parts 16a, 16b, 16c and 16d arranged at positions facing the height adjustment stage parts 15a, 15b, 15c and 15d of the outer frame base part 12. As depicted in FIG. 6A, in the state in which the outer frame cover part 13 has been bonded to the outer frame base part 12, each of four corner parts of the frame member 111 of the operation input panel 11 are stored in a space between each of the height adjustment stage parts 15a, 15b, 15c and 15d of the outer frame base part 12 and the corresponding projection parts 16a, 16b, 16c and 16d of the outer frame cover part 13. In this case, the corner parts of the frame member 111 are not sandwiched between the height adjustment stage parts 15a, 15b, 15c and 15d and the projection parts 16a, 16b, 16c and 16d but maintained in a state in which the frame member 111 is movable in sheet surface directions of the sheet-like member 112.

Thus, when the frame member 111 of the operation input panel 11 has not been elastically displaced as depicted in FIG. 6A, in each of the sub-units 141a, 141b, . . . , and 141n of the displacement sensor 14U, the metallic frame member 111 is detected by a metal sensor 142 situated at the same central position of the metal sensors 142 in the height direction.

When the frame member 111 of the operation input panel 11 has been elastically displaced downwardly as depicted in FIG. 6B according to the elastic displacement of the sheet-like member 112 explained with reference to FIGS. 4A to 4D, in each of the sub-units 141a, 141b, . . . , and 141n of the displacement sensor 14U, the metallic frame member 111 is detected by a metal sensor 142 situated at a lower height position that is lower than the aforementioned metal sensor 142 at the central position in the height direction detecting the metallic frame member 111 in the case of FIG. 6A and that varies depending on the elastic displacement of the metallic frame member 111 according to the magnitude and the application position of the external force.

When the frame member 111 of the operation input panel 11 has been elastically displaced upward in the arrow direction as depicted in FIG. 6C according to the elastic displacement of the sheet-like member 112 explained with reference to FIGS. 4A to 4D, in each of the sub-units 141a, 141b, . . . , and 141n of the displacement sensor 14U, the metallic frame member 111 is detected by a metal sensor 142 situated at a higher height position that is higher than the aforementioned metal sensor 142 at the central position in the height direction detecting the metallic frame member 111 in the case of FIG. 6A and that varies depending on the elastic displacement of the metallic frame member 111 according to the magnitude and the application position of the external force.

Although not illustrated in FIGS. 6B and 6C, the mode of the elastic displacement of the frame member 111 varies depending on the magnitude and the application position of the external force on the sheet-like member 112 of the operation input panel 11 as explained with reference to FIGS. 4A to 4D, and the position of the lowest point or the highest point in the direction of the side of the frame member 111 varies depending on the application position of the external force. In short, the protruding shape of the elastic displacement of the sheet-like member 112 varies depending on the magnitude and the application position of the external force, and the curve of the elastic displacement of the frame member 111 varies accordingly.

Therefore, in each of the sub-units 141a, 141b, . . . , and 141n of the displacement sensor 14U, the height direction position of the metal sensor 142 detecting the frame member 111 varies depending on the magnitude and the application position of the external force on the sheet-like member 112 of the operation input panel 11. Thus, the sub-units 141a, 141b, . . . , and 141n of the displacement sensor 14U output detection results that vary depending on the position where the external force is applied.

While the above explanation has been given of the displacement sensor 14U, the other displacement sensors 14D, 14L and 14R are also configured in the same way as mentioned earlier.

Here, it is assumed, for example, that a side of the outer frame cover part 13 with the mark MK depicted in FIG. 1 is placed on the upper side at times of the operation input to the operation input device 10. Further, it is assumed that the displacement sensor 14U is provided under the side of the outer frame cover part 13 with the mark MK.

Accordingly, as is evident from the above explanation, the displacement sensors 14U and 14D clarify the external force application position in a horizontal direction of the operation input device 10 as the arrangement direction of the plurality of sub-units 141a, 141b, . . . , and 141n of the displacement sensors 14U and 14D. Meanwhile, the displacement sensors 14L and 14R clarify the external force application position in a vertical direction of the operation input device 10 as the arrangement direction of the plurality of sub-units 141a, 141b, . . . , and 141n of the displacement sensors 14L and 14R. Further, the magnitude of the external force can be detected from the detection outputs of the sub-units 141a, 141b, . . . , and 141n of the four displacement sensors 14U, 14D, 14L and 14R.

Therefore, by using the detection outputs of the sub-units 141a, 141b, . . . , and 141n of the four displacement sensors 14U, 14D, 14L and 14R, it is possible to determine the operator's operation input position on the sheet-like member 112's sheet surface (operation surface) and the magnitude of the pressure at the time of the operation, that is, the external force application position and the magnitude of the external force.

Incidentally, while four displacement sensors are provided corresponding to the four sides of the quadrangular operation input panel 11 in the above example, the detection of the magnitude of the external force and the application position on the sheet-like member 112 of the operation input panel 11 is possible by providing at least two displacement sensors: one of the displacement sensors 14U and 14D and one of the displacement sensors 14L and 14R.

Figure 7A:
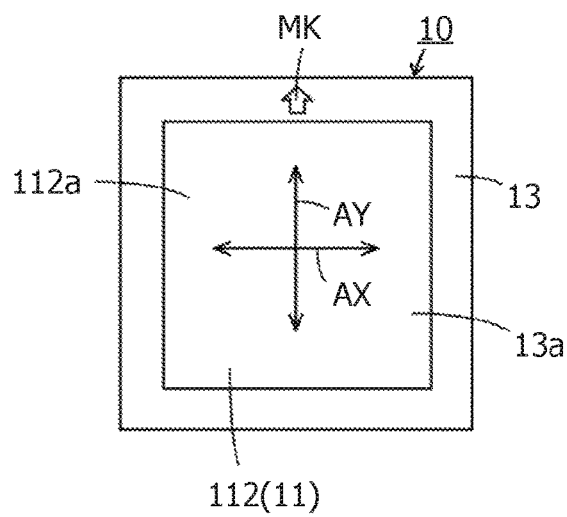
FIGS. 7A and 7B are diagrams depicting examples of an operation input in the operation input device according to the first embodiment of the present disclosure.

While the operation input to the operation input panel 11 in the above example is assumed to be made by external force applied to a point at a prescribed position, the operation input device in the first embodiment is configured to be capable of detecting a linear movement operation like that indicated by the arrow AX or AY in FIG. 7A. Further, the operation input device in the first embodiment is configured to be capable of detecting a rotational movement operation like that indicated by the arrow RT in FIG. 7B.

These movement operations can be detected also from the variations over time in the external force application position determined from the detection outputs of the aforementioned four displacement sensors 14U, 14D, 14L and 14R. However, in this embodiment, sensors other than the four displacement sensors 14U, 14D, 14L and 14R are provided on the outer frame base part 12 to make it possible to detect these movement operations with greater ease.

As depicted in FIG. 5A, in the operation input device 10 of the first embodiment, each of the four corner parts of the recessed part 12b of the outer frame base part 12 is provided with a pair of contact sensors: a contact sensor 17a, 17b, 17c, 17d arranged in the vertical direction and a contact sensor 18a, 18b, 18c, 18d arranged in the horizontal direction. Specifically, as depicted in FIG. 5A, the top left corner of the recessed part 12b of the outer frame base part 12 is provided with a pair of contact sensors 17a and 18a, the top right corner is provided with a pair of contact sensors 17b and 18b, the bottom left corner is provided with a pair of contact sensors 17c and 18c, and the bottom right corner is provided with a pair of contact sensors 17d and 18d.

Each contact sensor 17a, 17b, 17c, 17d, 18a, 18b, 18c, 18d detects the contact of the metallic frame member 111 of the operation input panel 11 to a surface facing the through hole 12a's side.

Figure 8A:
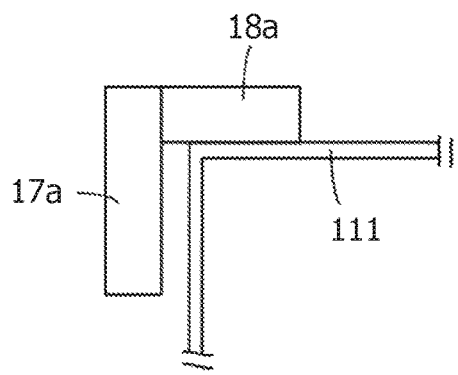
FIGS. 8A to 8D are diagrams for explaining the operation of part of the operation input device according to the first embodiment of the present disclosure.
Figure 8B:
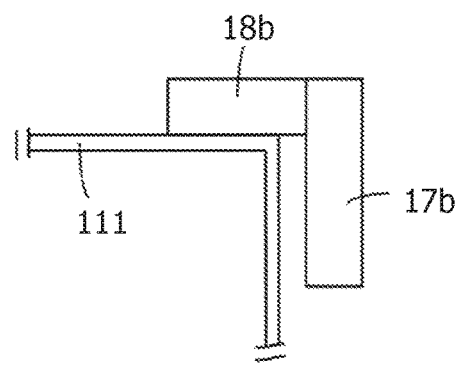

For example, when the operator performs the operation input by depressing and elastically displacing the sheet-like member 112 of the operation input panel 11 while moving the depressing position (external force application position) upward like the arrow AY in FIG. 7A, the frame member 111 of the operation input panel 11 makes contact with the contact sensors 18a and 18b arranged in the horizontal direction at the top of the recessed part 12b of the outer frame base part 12 as depicted in FIGS. 8A and 8B, and thus is detected by these contact sensors 18a and 18b by contact. In this case, at the bottom of the recessed part 12b of the outer frame base part 12, the frame member 111 of the operation input panel 11 is in a state of not contacting the contact sensors 18c and 18d arranged in the horizontal direction.

Thus, by the contact detection of the frame member 111 by the contact sensors 18a and 18b without the contact detection of the frame member 111 by the contact sensors 18c and 18d, the operator's upward movement operation input like the arrow AY in FIG. 7A is detected. Parenthetically, in this case, it is also possible to detect the operator's upward movement operation input like the arrow AY in FIG. 7A just by detecting the state of the contact detection of the frame member 111 by the contact sensors 18a and 18b.

Further, the movement start position and the movement end position of the operator's operation input can be detected from the maximum displacement position in the detection outputs of the displacement sensors 14L and 14R detecting the elastic displacement of the frame member 111. Also in this case, it is also possible to detect the movement start position and the movement end position from the detection outputs of one of the displacement sensors 14L and 14R.

When the operator performs the operation input by depressing and elastically displacing the sheet-like member 112 of the operation input panel 11 while moving the depressing position (external force application position) downwardly like the arrow AY in FIG. 7A, the operation input can be detected similarly to the above-described example while the presence/absence of the contact detection of the frame member 111 by the contact sensors 18a and 18b and the presence/absence of the contact detection of the frame member 111 by the contact sensors 18c and 18d are opposite to those in the above-described example.

Figure 8C:
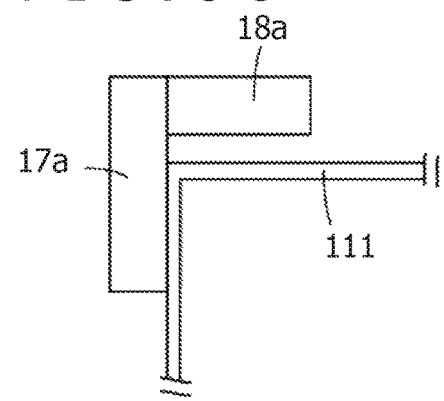
Figure 8D:
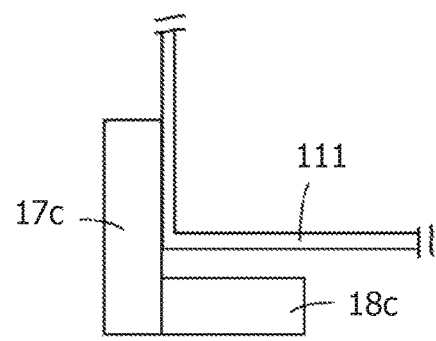

When the operator performs the operation input by depressing and elastically displacing the sheet-like member 112 of the operation input panel 11 while moving the depressing position (external force application position) leftward like the arrow AX in FIG. 7A, the frame member 111 of the operation input panel 11 makes contact with the contact sensors 17a and 17c arranged in the vertical direction at the left edge of the recessed part 12b of the outer frame base part 12 as depicted in FIGS. 8C and 8D, and thus is detected by these contact sensors 17a and 17c by contact. In this case, at the right edge of the recessed part 12b of the outer frame base part 12, the frame member 111 of the operation input panel 11 is in a state of not contacting the contact sensors 17b and 17d arranged in the vertical direction.

Thus, by the contact detection of the frame member 111 by the contact sensors 17a and 17c without the contact detection of the frame member 111 by the contact sensors 17b and 17d, the operator's leftward movement operation input like the arrow AX in FIG. 7A is detected. Parenthetically, in this case, it is also possible to detect the operator's leftward movement operation input like the arrow AX in FIG. 7A just by detecting the state of the contact detection of the frame member 111 by the contact sensors 17a and 17c.

Further, the movement start position and the movement end position of the operator's operation input can be detected from the maximum displacement position in the detection outputs of the displacement sensors 14U and 14D detecting the elastic displacement of the frame member 111. Also in this case, it is also possible to detect the movement start position and the movement end position from the detection outputs of one of the displacement sensors 14U and 14D.

When the operator performs the operation input by depressing and elastically displacing the sheet-like member 112 of the operation input panel 11 while moving the depressing position (external force application position) rightward like the arrow AX in FIG. 7A, the operation input can be detected similarly to the above-described example while the presence/absence of the contact detection of the frame member 111 by the contact sensors 17a and 17c and the presence/absence of the contact detection of the frame member 111 by the contact sensors 17b and 17d are opposite to those in the above-described example.

Figure 7B:
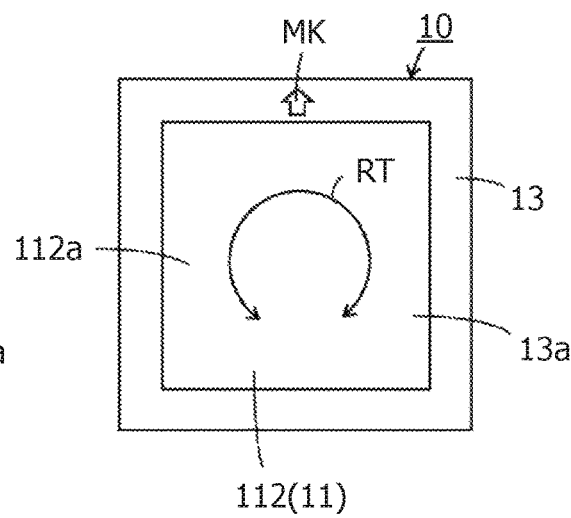
Figure 9A:
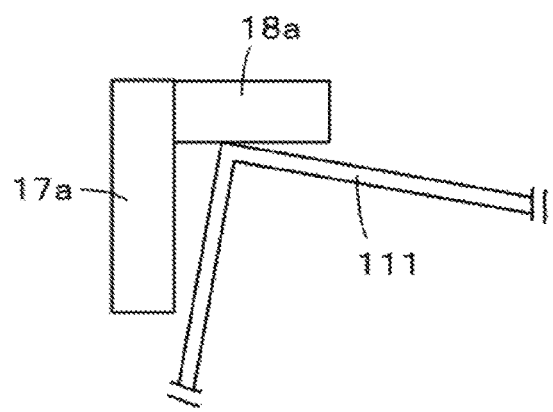
FIGS. 9A to 9D are diagrams for explaining the operation of part of the operation input device according to the first embodiment of the present disclosure.
Figure 9B:
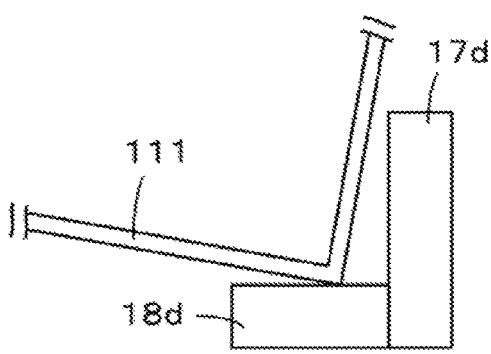

When the operator performs the operation input by depressing and elastically displacing the sheet-like member 112 of the operation input panel 11 while moving the depressing position (external force application position) in a right rotation direction (clockwise direction) like the arrow RT in FIG. 7B, the frame member 111 of the operation input panel 11 makes contact with the contact sensor 18a arranged in the horizontal direction at the top left of the recessed part 12b of the outer frame base part 12 while making contact with the contact sensor 18d arranged in the horizontal direction at the bottom right of the recessed part 12b of the outer frame base part 12 as depicted in FIGS. 9A and 9B, and thus is detected by these contact sensors 18a and 18d by contact.

Thus, by the contact detection of the frame member 111 by the contact sensors 18a and 18d, the operator's clockwise movement operation input like the arrow RT in FIG. 7B is detected. Parenthetically, in this case, the frame member 111 makes contact with the contact sensor 17c arranged in the vertical direction at the bottom left of the recessed part 12b of the outer frame base part 12 while making contact with the contact sensor 17b arranged in the vertical direction at the top right of the recessed part 12b of the outer frame base part 12 although not illustrated in FIGS. 9C and 9D, and thus the operator's clockwise movement operation input like the arrow RT in FIG. 7B may also be detected by means of the contact detection by the contact sensors 17c and 17b. It is also possible to detect the operator's clockwise movement operation input like the arrow RT in FIG. 7B based on the contact detection by all of the contact sensors 18a, 18d, 17c and 17b.

Figure 9C:
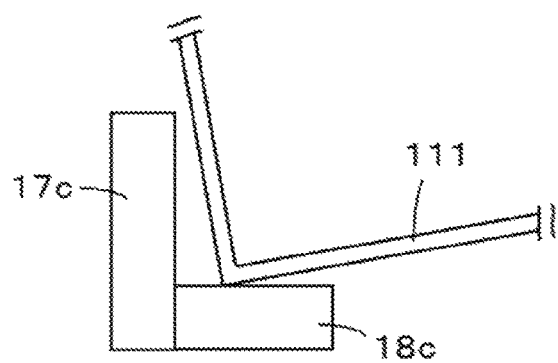
Figure 9D:
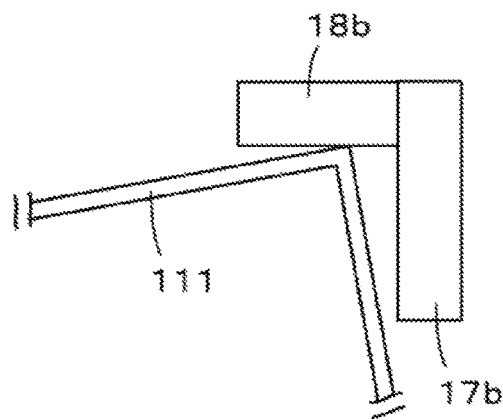

When the operator performs the operation input by depressing and elastically displacing the sheet-like member 112 of the operation input panel 11 while moving the depressing position (external force application position) in a left rotation direction (counterclockwise direction) like the arrow RT in FIG. 7B, the frame member 111 of the operation input panel 11 makes contact with the contact sensor 18c arranged in the horizontal direction at the bottom left of the recessed part 12b of the outer frame base part 12 while making contact with the contact sensor 18b arranged in the horizontal direction at the top right of the recessed part 12b of the outer frame base part 12 as depicted in FIGS. 9C and 9D, and thus is detected by these contact sensors 18c and 18b by contact.

Thus, by the contact detection of the frame member 111 by the contact sensors 18c and 18b, the operator's counterclockwise movement operation input like the arrow RT in FIG. 7B is detected. Parenthetically, in this case, the frame member 111 makes contact with the contact sensor 17a arranged in the vertical direction at the top left of the recessed part 12b of the outer frame base part 12 while making contact with the contact sensor 17d arranged in the vertical direction at the bottom right of the recessed part 12b of the outer frame base part 12 although not illustrated in FIGS. 9A and 9B, and thus the operator's counterclockwise movement operation input like the arrow RT in FIG. 7B may also be detected by means of the contact detection by the contact sensors 17a and 17d. It is also possible to detect the operator's counterclockwise movement operation input like the arrow RT in FIG. 7B based on the contact detection by all of the contact sensors 18c, 18b, 17a and 17d.

In the operation input device 10 of the first embodiment, as indicated by dotted lines in FIGS. 5A and 5B, the outer frame base part 12 is provided with a signal transmission circuit 20 that receives the detection outputs of the displacement sensors 14U, 14D, 14L and 14R and the contact sensors 17a, 18a, 17b, 18b, 17c, 18c, 17d and 18d explained above and transmits a signal to the outside.

Figure 10:
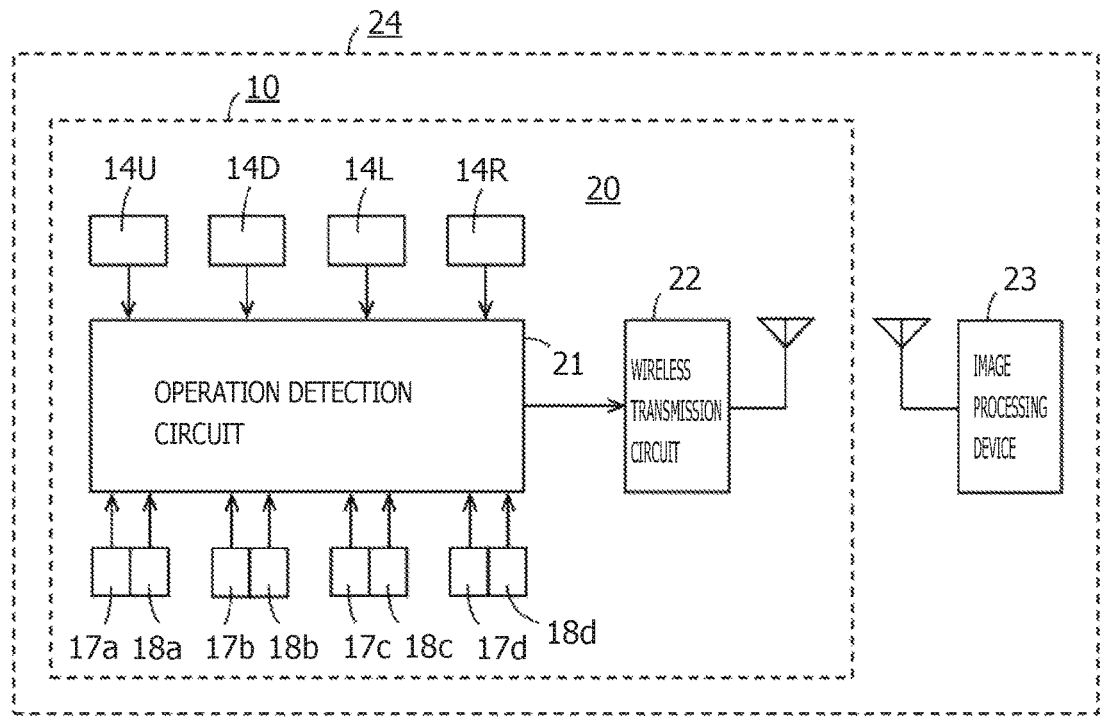
FIG. 10 is a block diagram depicting an example of the configuration of a signal transmission circuit in the operation input device according to the first embodiment of the present disclosure.

An example of the configuration of the signal transmission circuit 20 in the operation input device 10 according to the first embodiment will be described below with reference to FIG. 10. In the operation input device 10 of the first embodiment, the signal transmission circuit 20 includes an operation detection circuit 21 and a wireless transmission circuit 22.

The operation detection circuit 21 is supplied with the detection outputs of the displacement sensors 14U, 14D, 14L and 14R and the contact sensors 17a, 18a, 17b, 18b, 17c, 18c, 17d and 18d explained above. The operation detection circuit 21 detects the operator's operation input position on the sheet surface of the sheet-like member 112 of the operation input panel 11 and the direction and the magnitude of the force applied to the sheet-like member 112 at the operation input position based on the detection outputs from the displacement sensors 14U, 14D, 14L and 14R as explained earlier. Then, the operation detection circuit 21 supplies the wireless transmission circuit 22 with information on the detected operation input position and information on the direction and the magnitude of the force at the position as a transmission signal.

The operation detection circuit 21 also detects the linear movement in the direction of the arrow AY or AX in FIG. 7A and the rotational movement in the rotation direction of the arrow RT in FIG. 7B based on the detection outputs of the contact sensors 17a, 18a, 17b, 18b, 17c, 18c, 17d and 18d as explained earlier. Further, the operation detection circuit 21 detects the start position and the end position of the movement based on the detection outputs of displacement sensors 14U, 14D, 14L and 14R.

Then, the operation detection circuit 21 supplies the wireless transmission circuit 22 with information on the moving direction of the detected operation input position and information on the start position and the end position of the movement. Incidentally, the operation detection circuit 21 may also be configured to supply the wireless transmission circuit 22 with not the information on the start position and the end position of the movement but information on the distance between the start position and the end position of the movement, that is, information on the moving distance. In such cases, the information on the movement start position may also be sent to the wireless transmission circuit 22 together with the information on the moving distance.

The wireless transmission circuit 22 is a circuit for performing short-range wireless communication according to the standard of Bluetooth (registered trademark), for example. The wireless transmission circuit 22 converts the signal received from the operation detection circuit 21 into a transmission signal and wirelessly transmits the transmission signal to an image processing device 23 including a computer or the like, for example. In this case, an image processing system 24 is formed by the image processing device 23 and the operation input device 10.

Incidentally, the wireless communication may also be carried out by using light or infrared rays instead of using radio waves as above. Further, instead of using the wireless transmission circuit 22, it is also possible to configure an interface according to the universal serial bus (USB) standard and provide a USB terminal so as to perform the communication with an external device via a USB cable, for example. Wireless communication according to the USB standard is of course also possible.

The operation input device 10 of this embodiment is used, for example, for operations for three-dimensionally deforming an object image displayed on a display screen of an information processing device such as a computer. The transmission signal from the wireless transmission circuit 22 is sent to the information processing device. In such cases, application software for identifying an operation command for the object image, corresponding to the signal generated by the operation detection circuit 21 as explained above, based on the signal has previously been installed in the information processing device.

Therefore, the information processing device processes the signal received from the operation input device 10 of this embodiment by using the application software and performs image deformation on the object image displayed on the display screen so as to visually cause three-dimensional deformation to the object image. In this case, possible processing in the image deformation process includes hollowing or bulging a part specified by the operation input position according to the magnitude of the force at the operation input position, moving the object image linearly or rotationally according to a moving direction command from the operation input device 10, deforming the object image as if the object received force in the moving direction, deforming the object image as if the object was twisted in the rotation direction, and so forth.

As described above, with the operation input device 10 according to this embodiment, the operator can easily issue commands for three-dimensionally deforming the object image displayed on the display screen, such as hollowing, bulging or twisting the object image, by performing the operation input not only from the front surface side but also from the back surface side of the sheet-like member 112 of the operation input panel 11.

Further, in this case, the sheet-like member 112 of the operation input panel 11 is elastically displaced by the depressing force of the operator's operation input, and thus the operator can haptically sense the hollowing, bulging, twisting or the like the operator intends to command as the operation. Thus, the operation input device 10 according to this embodiment achieves a remarkable effect of allowing the operator to intuitively perform the deformation operation while visually checking the deformation of the object image on the display screen of the information processing device.

Modification of First Embodiment

<Another Example of Displacement Sensor>

In the above-described operation input device 10 according to the first embodiment, the displacement sensors 14U, 14D, 14L and 14R have been described as sensors obtained by stacking up metal sensors such as proximity sensors or contact sensors. However, the displacement sensors 14U, 14D, 14L and 14R are not limited to such a configuration.

Figure 11A:
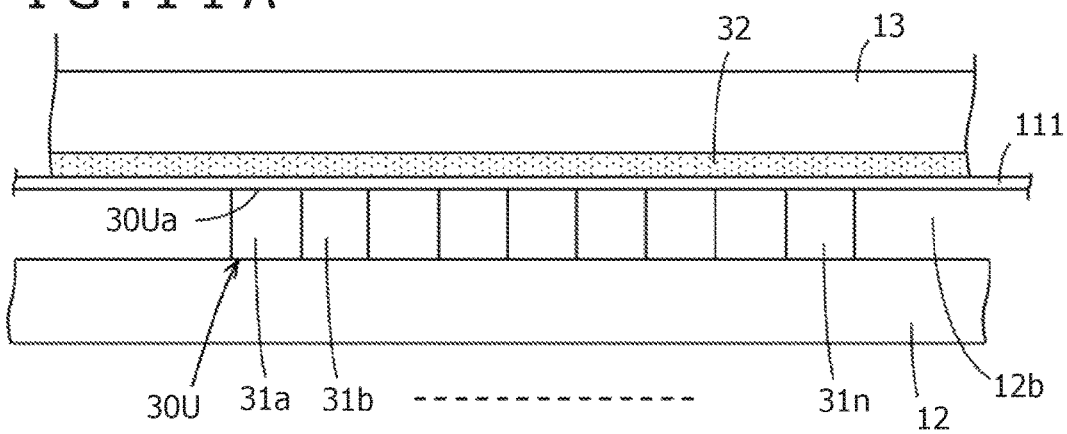
FIGS. 11A and 11B are diagrams depicting another configuration example of part of the operation input device according to the first embodiment of the present disclosure.
Figure 11B:
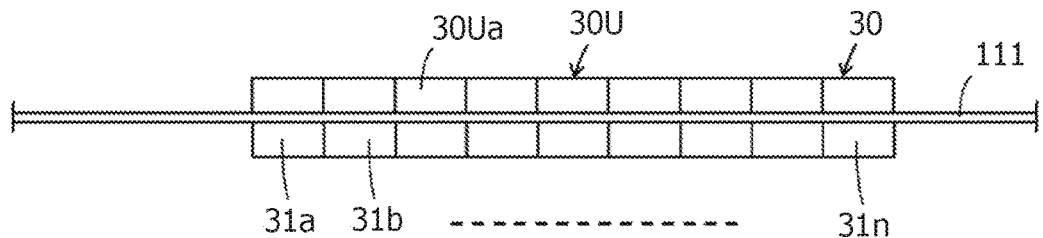

For example, it is possible to employ displacement sensors 30U, 30D, 30L and 30R using pressure sensors instead of the displacement sensors 14U, 14D, 14L and 14R in the above embodiment. FIGS. 11A and 11B are diagrams depicting part of a configuration example of the displacement sensors 30U, 30D, 30L and 30R in this case. FIGS. 11A and 11B depict a part including the displacement sensor 30U as a representative.

As depicted in FIG. 11A, in this example, the displacement sensor 30U formed of a pressure sensor is arranged in the recessed part 12b of the outer frame base part 12. The displacement sensor 30U, as a sensor capable of detecting the pressure applied from above, includes a plurality of sub-units 31a, 31b, . . . , and 31n arranged along a side of the frame member 111 similarly to the displacement sensor 14U in the above embodiment. The displacement sensor 30U is configured so that each sub-unit 31a, 31b, . . . , 31n is capable of independently detecting pressure.

In the example of FIGS. 11A and 11B, the frame member 111 of the operation input panel 11 is set on a top surface 30Ua of the displacement sensor 30U as depicted in FIGS. 11A and 11B. In this example, the frame member 111 is arranged to be pressed by the outer frame cover part 13 towards the outer frame base part 12's side via an elastic member 32 with a prescribed pressure.

Therefore, to the displacement sensor 30U formed of the pressure sensor, pressure at an offset value like that depicted in FIG. 12 is applied even when no external force of the operator's operation input is applied to the operation input panel 11.

When external force is applied to the operation input panel 11 and the frame member 111 of the operation input panel 11 is elastically displaced, a pressure change corresponding to the elastic displacement is detected by each sub-unit 31a, 31b, . . . , 31n of the displacement sensor 30U as a change from the offset value.

Specifically, when external force of an operation input from the outer frame cover part 13's through hole 13a's side is applied to the sheet-like member 112 of the operation input panel 11, the frame member 111 is elastically displaced in a direction of increasing the pressure on the displacement sensor 30U. Accordingly, due to the elastic displacement of the frame member 111, pressure higher than the offset value is applied to the displacement sensor 30U as indicated by the dotted line in FIG. 12.

Similarly, when external force of an operation input from the outer frame base part 12's through hole 12a's side is applied to the sheet-like member 112 of the operation input panel 11, the frame member 111 is elastically displaced in a direction of decreasing the pressure on the displacement sensor 30U. Accordingly, due to the elastic displacement of the frame member 111, pressure lower than the offset value is applied to the displacement sensor 30U as indicated by the chain line in FIG. 12.

In such cases, the pressure applied to each sub-unit 31a, 31b, . . . , 31n of the displacement sensor 30U differs from each other according to the elastic displacement of the frame member 111, and thus a pressure change according to the elastic displacement of the frame member 111 is detected by each sub-unit 31a, 31b, . . . , 31n. Therefore, a detection output according to the magnitude and the application position of the external force applied to the sheet-like member 112 of the operation input panel 11 is obtained from each sub-unit 31a, 31b, . . . , 31n of the displacement sensor 30U.

Except for the use of the displacement sensors 30U, 30D, 30L and 30R instead of the displacement sensors 14U, 14D, 14L and 14R, the rest of the configuration is equivalent to that in the above-described first embodiment. Therefore, effects similar to the above-described effects of the first embodiment are obtained also in this example.

<Another Example of Outer Frame>

In the above-described embodiment, the outer frame base part 12 and the outer frame cover part 13 are formed in the quadrangular shape to have the quadrangular through holes 12a and 13a at the center since the outer frame is formed to surround the entire periphery of the quadrangular operation input panel 11. However, the outer frame does not necessarily have to be formed to surround the entire periphery of the operation input panel 11.

For instance, in the example depicted in FIG. 13A, an outer frame 41 is configured to hold three sides of the frame member 111 of the quadrangular operation input panel 11. Although not illustrated here, the outer frame 41 includes an outer frame base part configured like the outer frame base part 12 from which one side has been removed and an outer frame cover part configured like the outer frame cover part 13 from which one side has been removed. In this example, although not illustrated here, the outer frame base part constituting a part of the outer frame 41 is provided with the aforementioned displacement sensors 14U, 14L and 14R or displacement sensors 30U, 30L and 30R, and the four corners of the operation input panel 11 are provided with the aforementioned four pairs of contact sensors 17a, 18a, 17b, 18b, 17c, 18c, 17d and 18d.

In the operation input device 10A in the example of FIG. 13A, although the horizontal direction position of the external force of the operation input on the sheet-like member 112 of the operation input panel 11 is detected only by the displacement sensor 14U or 30U since the displacement sensor 14D or 30D is not provided, the detection of the horizontal direction position of the external force of the operation input on the sheet-like member 112 can be made with the displacement sensor 14U or 30U alone as mentioned earlier.

Accordingly, also in the operation input device 10A in the example of FIG. 13A, effects similar to the above-described effects of the operation input device 10 according to the first embodiment are obtained.

In the example depicted in FIG. 13B, an outer frame 42 is configured to hold two sides of the frame member 111 of the quadrangular operation input panel 11. Although not illustrated here, the outer frame 42 includes an L-shaped outer frame base part configured like the outer frame base part 12 from which two sides have been removed and an L-shaped outer frame cover part configured like the outer frame cover part 13 from which two sides have been removed. In this example, although not illustrated here, the outer frame base part constituting a part of the outer frame 42 is provided with the aforementioned displacement sensors 14L and 14D or displacement sensors 30L and 30D, and three corners of the operation input panel 11 are provided with the aforementioned three pairs of contact sensors 17a, 18a, 17c, 18c, 17d and 18d.

Thus, in the operation input device 10B in the example of FIG. 13B, the horizontal direction position and the vertical direction position of the external force of the operation input on the sheet-like member 112 of the operation input panel 11 are respectively detected only by the displacement sensors 14D or 30D and the displacement sensors 14L or 30L since the displacement sensor 14U or 30U and the displacement sensor 14R or 30R are not provided. However, the detection of the horizontal direction position and the vertical direction position of the external force of the operation input on the sheet-like member 112 can be made only with the displacement sensor 14D or 30D and the displacement sensor 14L or 30L as mentioned earlier.

Further, the linear movement and the rotational movement of the operation position on the sheet-like member 112 of the operation input panel 11 depicted in FIGS. 7A and 7B can be detected also with the three pairs of contact sensors 17a, 18a, 17c, 18c, 17d and 18d.

Accordingly, also in the operation input device 10B in the example of FIG. 13B, effects similar to the above-described effects of the operation input device 10 according to the first embodiment are obtained.

In the example depicted in FIG. 13C, an outer frame 43 is configured to hold only one side of the frame member 111 of the quadrangular operation input panel 11. Although not illustrated here, the outer frame 43 includes an I-shaped outer frame base part configured like the outer frame base part 12 from which three sides have been removed and an I-shaped outer frame cover part configured like the outer frame cover part 13 from which three sides have been removed. In this example, although not illustrated here, the outer frame base part constituting a part of the outer frame 43 is provided with the aforementioned displacement sensor 14L or 30L, and the upper and lower ends of the outer frame base part are provided with the aforementioned two pairs of contact sensors 17a, 18a, 17c and 18c.

In the example of FIG. 13C, one of the horizontal direction position and the vertical direction position of the external force of the operation input on the sheet-like member 112 of the operation input panel 11 can be detected since only the displacement sensor 14L or 30L is provided. As for the linear movement of the operation position on the sheet-like member 112 of the operation input panel 11 depicted in FIG. 7A, linear movement in the directions of only one of the arrows AX and AY can be detected. The rotational movement depicted in FIG. 7B can be detected by the aforementioned two pairs of contact sensors 17a, 18a, 17c and 18c. Except for the above restriction, effects similar to the above-described effects of the operation input device 10 according to the first embodiment are obtained also in the operation input device 10C in the example of FIG. 13C.

<Another Example of Sheet-Like Member 112>

While the sheet-like member 112 of the operation input panel 11 in the above embodiment was assumed to be a plate-shaped sheet made of rubber, for example, a sheet-like member 113 configured like a mesh depicted in FIG. 14 may also be used. In the example depicted in FIG. 14, an operation input panel 11M is formed by fixing the sheet-like member 113 configured like a mesh to the frame member 111 to inscribe the frame member 111.

<Another Example of Shapes of Outer Frame and Frame Member of Operation Input Panel>

While the shape of the outer frame and the shape of the frame member of the operation input panel corresponding to the shape of the outer frame are quadrangular shapes in the above embodiment, the shapes of the outer frame and the frame member are not limited to quadrangular shapes but can be various shapes. In cases where the shape of the outer frame and the shape of the frame member of the operation input panel corresponding to the shape of the outer frame are polygonal shapes, effects similar to the effects of the operation input device 10 according to the above embodiment can be obtained by providing a displacement sensor for detecting the elastic displacement of a side of the frame member of the operation input panel at each position corresponding to a side of the frame member and providing a pair of contact sensors at each corner part formed by two sides similarly to the aforementioned case of quadrangular shapes.

However, in cases where the shape of the outer frame and the shape of the frame member of the operation input panel corresponding to the shape of the outer frame are circular shapes, the configuration of the sensors differs from that in the above embodiment.

Figure 15A:
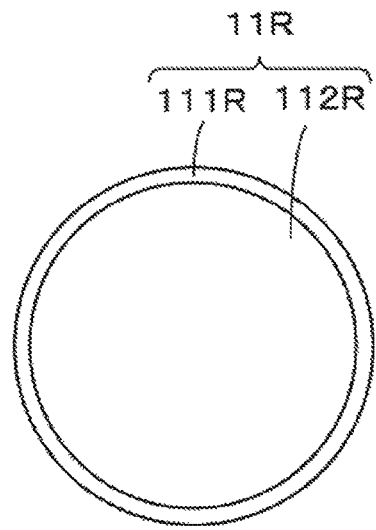
FIGS. 15A and 15B are diagrams depicting a modification of part of the first embodiment of the operation input device according to the first embodiment of the present disclosure.
Figure 15B:
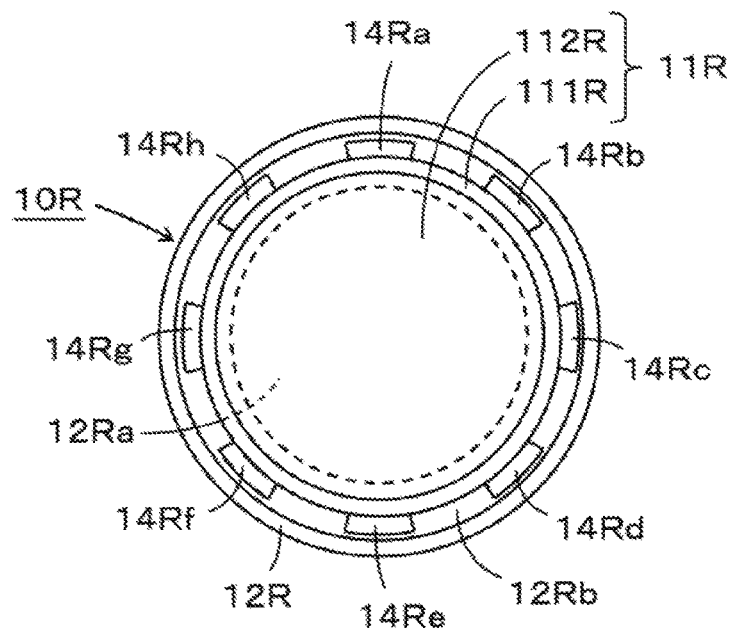

FIGS. 15A and 15B are diagram for explaining part of an operation input device 10R in which the shape of the outer frame is a circular shape. As depicted in FIG. 15A, an operation input panel 11R in the operation input device 10R in this example is formed by fixing a circular sheet-like member 112R to a circular frame member 111R to inscribe the circular frame member 111R.

As depicted in FIG. 15B, in a recessed part 12Rb of a ring-shaped outer frame base part 12R having a circular through hole 12Ra, a plurality of displacement sensors for detecting the elastic displacement of the frame member 111R of the operation input panel 11R, namely, eight displacement sensors 14Ra, 14Rb, 14Rc, 14Rd, 14Re, 14Rf, 14Rg and 14Rh in this example, are arranged along the circumference of the frame member 111R at even angular intervals, namely, at angular intervals of 45 degrees in this example.

Each displacement sensor 14Ra, 14Rb, 14Rc, 14Rd, 14Re, 14Rf, 14Rg, 14Rh is configured in the same way as each displacement sensor 14U, 14D, 14L, 14R explained referring to FIGS. 6A to 6C. It is also possible to employ a sensor like the displacement sensor 30U, 30D, 30L, 30R using a pressure sensor explained referring to FIGS. 11A, 11B and 12 as each displacement sensor 14Ra, 14Rb, 14Rc, 14Rd, 14Re, 14Rf, 14Rg, 14Rh.

In the operation input device 10R in this example, a signal transmission circuit, not depicted, detects whether the operator's depressing operation input is from the front surface side of the sheet-like member 112R or from the back surface side of the sheet-like member 112R, the position of the depressing operation input, and the magnitude of the force applied by the depressing operation based on the detection outputs of the displacement sensors 14Ra, 14Rb, 14Rc, 14Rd, 14Re, 14Rf, 14Rg and 14Rh.

Further, the signal transmission circuit detects the moving direction (linear direction or rotational direction) of the depressing operation input based on the variations over time in the detection outputs of the displacement sensors 14Ra, 14Rb, 14Rc, 14Rd, 14Re, 14Rf, 14Rg and 14Rh. Thus, the aforementioned pairs of contact sensors at the four corner parts used in the operation input device 10 having the quadrangular outer shape are unnecessary in the operation input device 10R in this example.

While eight displacement sensors 14Ra, 14Rb, 14Rc, 14Rd, 14Re, 14Rf, 14Rg and 14Rh are arranged in the example of FIGS. 15A and 15B, effects similar to the effects of the above-described operation input device 10R can be achieved by just arranging four displacement sensors at angular intervals of 90 degrees.

OTHER EXAMPLES

Incidentally, for just determining whether the depressing operation input made on the operation input panel 11, 11A or 11R is from the front surface side or from the back surface side and detecting the applied depressing force, it is unnecessary to provide a plurality of sensors as above; providing one displacement sensor is sufficient.

It is possible to provide the sensors not on the outer frame base part 12 but on the outer frame cover part 13's side. The sensors may also be provided on both the outer frame base part 12 and the outer frame cover part 13. Similarly, it is possible to provide the signal transmission circuit not on the outer frame base part 12 but on the outer frame cover part 13's side. It is also possible to provide a part of the signal transmission circuit on the outer frame base part 12 and the remaining part of the signal transmission circuit on the outer frame cover part 13.

Second Embodiment

In the first embodiment described above, the operation input panel is formed by fixing a sheet-like member to a frame member and the sensors are arranged on either of the outer frame base part 12 and the outer frame cover part 13 constituting the outer frame. However, the operation input device according to the present disclosure is not limited to such a configuration. In a second embodiment described below, the operation input panel is formed only of a sheet-like member having elasticity and the displacement sensors are attached to the sheet-like member.

Figure 16A:
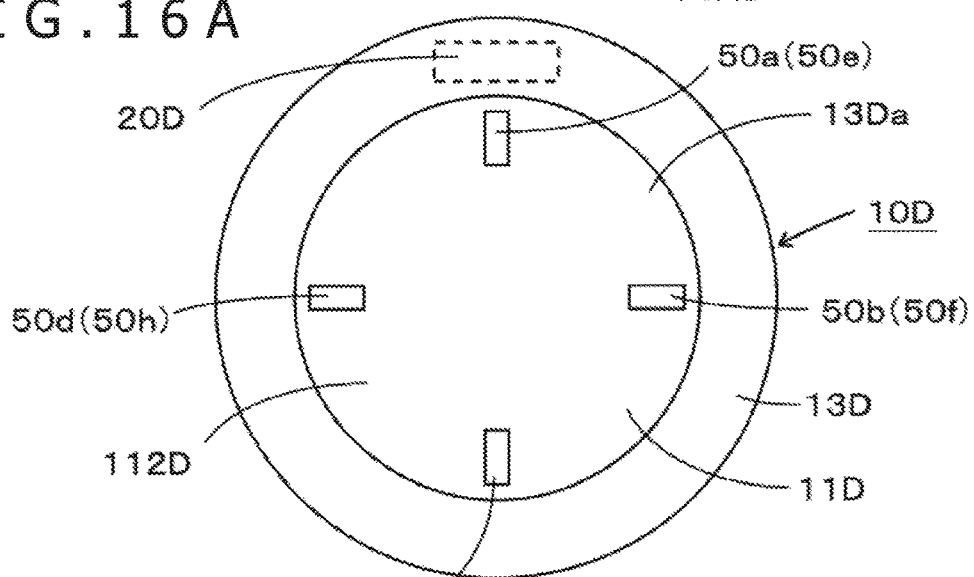
FIGS. 16A and 16B are diagrams for explaining an example of the configuration of an embodiment of operation input device according to a second embodiment of the present disclosure.
Figure 16B:
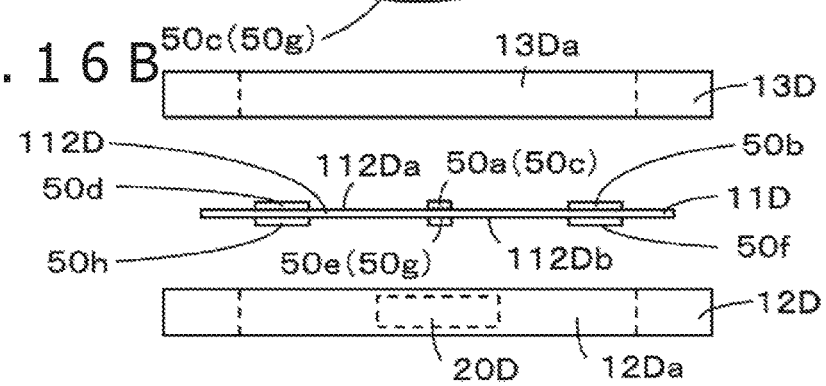

FIGS. 16A and 16B are diagrams for explaining an example of the configuration of an operation input device 10D according to the second embodiment. FIG. 16A is a diagram depicting the external appearance of the operation input device 10D according to the second embodiment. FIG. 16B is a diagram depicting principal components of the operation input device 10D according to the second embodiment in a disassembled state. Incidentally, FIG. 16B is a diagram depicting the operation input device 10D as viewed from the side.

As depicted in FIGS. 16A and 16B, the operation input device 10D according to the second embodiment includes an operation input panel 11D, an outer frame base part 12D and an outer frame cover part 13D. The operation input panel 11D is formed of a sheet-like member 112D having elasticity. The sheet-like member 112D is formed of a rubber sheet in this example.

The outer frame base part 12D and the outer frame cover part 13D constitute an outer frame of the operation input part 10D. The operation input panel 11D is held by being pressed and sandwiched between the outer frame base part 12D and the outer frame cover part 13D. Thus, in the second embodiment, the operation input panel 11D is configured by having its peripheral part fixed by the outer frame base part 12D and the outer frame cover part 13D.

In the second embodiment, a plurality of displacement sensors, implemented by strain sensing elements (strain gauges) in this example, are provided on the front surface 112Da's side and the back surface 112Db's side of the sheet-like member 112D of the operation input panel 11D. Specifically, in the example of FIGS. 16A and 16B, four strain sensing elements 50a, 50b, 50c and 50d are provided on the front surface 112Da's side of the sheet-like member 112D at angular intervals of 90 degrees. On the back surface 112Db's side of the sheet-like member 112D, four strain sensing elements 50e, 50f, 50g and 50h are provided at angular intervals of 90 degrees. In this case, the four strain sensing elements 50a, 50b, 50c and 50d on the front surface 112Da's side and the four strain sensing elements 50e, 50f, 50g and 50h on the back surface 112Db's side are arranged at the same angular positions to face each other via the sheet-like member 112D.

In this example, each strain sensing element 50a, 50b, 50c, 50d, 50e, 50f, 50g, 50h is formed by use of a semiconductor strain gauge that uses the piezoresistive effect in which the electrical resistivity of a semiconductor changes depending on the stress.

In the operation input device 10D in this example, when no operation input is made on the sheet-like member 112D of the operation input panel 11D, each of the four strain sensing elements 50a, 50b, 50c and 50d on the front surface 112Da's side of the sheet-like member 112D and each of the four strain sensing elements 50e, 50f, 50g and 50h on the back surface 112Db's side of the sheet-like member 112D arranged at the same angular position exhibit substantially equal resistance values.

For example, when the depressing operation input is made on the sheet-like member 112D from the front surface 112Da's side of the sheet-like member 112D, the sheet-like member 112D is elastically displaced to be protruded to the outer frame base part 12D's through hole 12Da's side as explained earlier. When the depressing operation input is made on the sheet-like member 112D from the back surface 112Db's side of the sheet-like member 112D, the sheet-like member 112D is elastically displaced to be protruded to the outer frame cover part 13D's through hole 13Da's side as explained earlier.

In such cases, while the four strain sensing elements 50a, 50b, 50c and 50d on the front surface 112Da's side of the sheet-like member 112D and the four strain sensing elements 50e, 50f, 50g and 50h on the back surface 112Db's side of the sheet-like member 112D change their resistance values due to the elastic displacement of the sheet-like member 112D, their resistance values differ from each other by an amount corresponding to the thickness of the sheet-like member 112D.

Specifically, when the sheet-like member 112D is elastically displaced to be projected to the outer frame base part 12D's through hole 12Da's side, the back surface 112Db's side of the sheet-like member 112D stretches more than the front surface 112Da's side. Conversely, when the sheet-like member 112D is elastically displaced to be protruded to the outer frame cover part 13D's through hole 13Da's side, the front surface 112Da's side of the sheet-like member 112D stretches more than the back surface 112Db's side.

Accordingly, a difference in the resistance value occurs between the strain sensing element 50a, 50b, 50c, 50d on the front surface 112Da's side of the sheet-like member 112D and the strain sensing element 50e, 50f, 50g, 50h on the back surface 112Db's side of the sheet-like member 112D arranged at the same angular position, and the determination on whether the elastic displacement is protruded to the outer frame base part 12D's through hole 12Da's side or protruded to the outer frame cover part 13D's through hole 13Da's side can be made based on whether the difference is positive or negative. Further, the absolute value of the difference corresponds to the magnitude of the elastic displacement of the sheet-like member 112D, that is, the magnitude of the external force applied to the sheet-like member 112D by the operation input.

Furthermore, differences occur among the resistance value differences between the four strain sensing elements 50a, 50b, 50c and 50d on the front surface 112Da's side of the sheet-like member 112D and the four strain sensing elements 50e, 50f, 50g and 50h on the back surface 112Db's side of the sheet-like member 112D arranged at the same angular positions depending on the position where the depressing operation input is made to the sheet-like member 112D. Therefore, the position of the depressing operation input to the sheet-like member 112D can be detected based on the differences among the four resistance value differences.

Moreover, the linear movement and the rotational movement of the operation position depicted in FIGS. 7A and 7B on the sheet-like member 112D of the operation input panel 11D can be detected based on the variations over time in the resistance value differences between the four strain sensing elements 50a, 50b, 50c and 50d on the front surface 112Da's side of the sheet-like member 112D and the four strain sensing elements 50e, 50f, 50g and 50h on the back surface 112Db's side of the sheet-like member 112D arranged at the same angular positions.

In the second embodiment, the outer frame base part 12 is provided with a signal transmission circuit 20 including an operation detection circuit and a wireless transmission circuit. The operation detection circuit includes a circuit for detecting the resistance variations of the strain sensing elements 50a, 50b, 50c and 50d and the strain sensing elements 50e, 50f, 50g and 50h and detects the operation inputs described above.

Incidentally, the shape of the outer frame in the second embodiment is not limited to a circular shape but can of course be a polygonal shape such as a quadrangular shape similarly to the first embodiment.

The operation input panel 11D in the second embodiment may also be configured by having the sheet-like member 112D fixed to a frame member similarly to the first embodiment and having the frame member pressed and sandwiched between the outer frame base part 12D and the outer frame cover part 13D.

Third Embodiment

An operation input device according to a third embodiment differs from the operation input devices according to the above embodiments in the method for detecting the elastic displacement of the sheet surface of the operation input panel.

Figure 17:
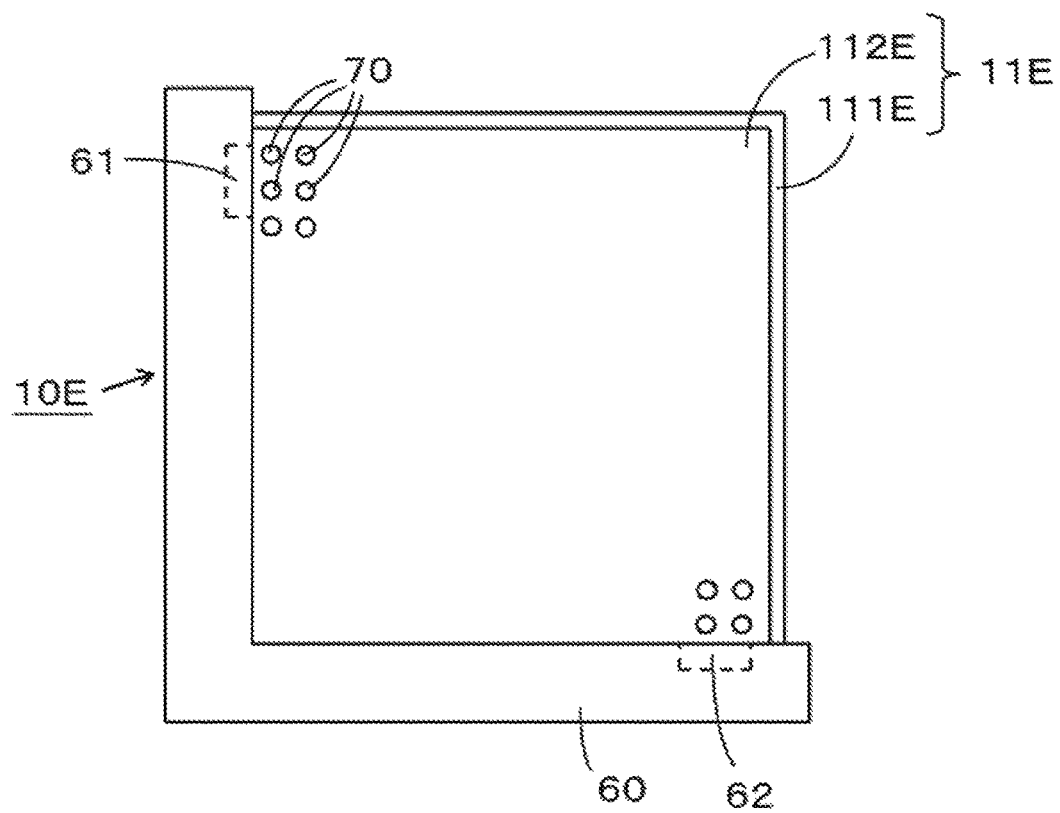
FIG. 17 is a diagram for explaining an example of the configuration of an operation input device according to a third embodiment of the present disclosure.

FIG. 17 is a diagram for explaining an example of the configuration of an operation input device 10E according to the third embodiment. In the example depicted in FIG. 17, the operation input device 10E includes an L-shaped outer frame 60. An operation input panel 11E is attached to the outer frame 60. Although not illustrated here, the outer frame 60 includes an outer frame base part and an outer frame cover part similarly to the outer frames in the above embodiments and is configured to fix the operation input panel 11E in a quadrangular shape by sandwiching two sides of the operation input panel 11E.

The operation input panel 11E is configured by fixing a sheet-like member 112E to a frame member 111E. Marks to be used for detecting the protruding elastic displacement of the sheet-like member 112E are formed on the front surface side of the sheet-like member 112E in this example. In this example, dot marks 70 in grid-like patterns, indicated by small circles in FIG. 17, are formed on the front surface side of the sheet-like member 112E by means of printing or the like, for instance.

On the other hand, image pickup devices 61 and 62 for capturing images of the grid-like patterns of the dot marks 70 formed on the front surface side of the sheet-like member 112E are provided at positions on the outer frame 60 facing the front surface side of the sheet-like member 112E of the operation input panel 11E. In this case, the image pickup device 61 is provided on a vertical direction part of the L-shaped outer frame 60 and the image pickup device 62 is provided on a horizontal direction part of the outer frame 60.

In the third embodiment, each image pickup device 61, 62 supplies the operation detection circuit of the signal transmission circuit, not depicted, with captured image information obtained by capturing an image of the grid-like pattern of the dot marks 70 on the sheet-like member 112E. Based on the captured image information received from the image pickup devices 61 and 62, the operation detection circuit detects the shapes of the grid-like patterns of the dot marks 70 on the sheet-like member 112E and figures out the direction of the depressing operation input to the sheet-like member 112E (from the front surface side or from the back surface side), the input position, and the magnitude of the applied external force.

Specifically, the captured image obtained by the image capturing by the image pickup device 61 is a captured image of the grid-like pattern of the dot marks 70 as viewed in a direction orthogonal to the vertical direction part of the L-shaped outer frame 60, that is, as viewed in the horizontal direction in FIG. 17. The captured image obtained by the image capturing by the image pickup device 62 is a captured image of the grid-like pattern of the dot marks 70 as viewed in a direction orthogonal to the horizontal direction part of the L-shaped outer frame 60, that is, as viewed in the vertical direction in FIG. 17.

When no depressing operation input is made on the sheet-like member 112E, the grid-like patterns of the dot marks 70 detected based on the captured images from the image pickup devices 61 and 62 are substantially in square shapes.

When the depressing operation input is made from the front surface side of the sheet-like member 112E, the sheet-like member 112E is elastically displaced to be protruded to the back surface side. In this case, the grid-like pattern of the dot marks 70 detected based on the captured image from the image pickup device 61 is displaced to gradually narrow (in a trapezoidal shape) in the horizontal direction in FIG. 17. The direction of gradually narrowing is the direction heading from the position of the image pickup device 61 to the position where the depressing operation input is made to the sheet-like member 112E. The degree of gradually narrowing corresponds to the magnitude of the force applied to the sheet-like member 112E. Meanwhile, the grid-like pattern of the dot marks 70 detected based on the captured image from the image pickup device 62 is displaced to gradually narrow (in a trapezoidal shape) in the vertical direction in FIG. 17. The direction of gradually narrowing is the direction heading from the position of the image pickup device 62 to the position where the depressing operation input is made to the sheet-like member 112E. The degree of gradually narrowing corresponds to the magnitude of the force applied to the sheet-like member 112E.

Conversely, when the depressing operation input is made from the back surface side of the sheet-like member 112E, the sheet-like member 112E is elastically displaced to be protruded to the front surface side. In this case, the grid-like pattern of the dot marks 70 detected based on the captured image from the image pickup device 61 is displaced to gradually widen (in an inverted trapezoidal shape) in the horizontal direction in FIG. 17. The direction of gradually widening is the direction heading from the position of the image pickup device 61 to the position where the depressing operation input is made to the sheet-like member 112E. The degree of gradually widening corresponds to the magnitude of the force applied to the sheet-like member 112E. Meanwhile, the grid-like pattern of the dot marks 70 detected based on the captured image from the image pickup device 62 is displaced to gradually widen (in an inverted trapezoidal shape) in the vertical direction in FIG. 17. The direction of gradually widening is the direction heading from the position of the image pickup device 62 to the position where the depressing operation input is made to the sheet-like member 112E. The degree of gradually widening corresponds to the magnitude of the force applied to the sheet-like member 112E.

Also in the third embodiment, the linear movement and the rotational movement of the operation position depicted in FIGS. 7A and 7B on the sheet-like member 112E of the operation input panel 11E can be detected based on the variations over time in the detection result of the operation input detected from the captured images from the image pickup devices 61 and 62.

Accordingly, effects similar to the above-described effects of the first embodiment are obtained also in the operation input device 10E according to the third embodiment.

Incidentally, the marks put on the sheet-like member of the operation input panel are not limited to grid-like patterns; it is sufficient if the marks are formed in a pattern allowing for the detection of the elastic displacement of the sheet-like member from the captured images.

Further, the marks put on the sheet-like member of the operation input panel may be formed on the back surface side of the sheet-like member and the image pickup devices may be arranged to capture images of the patterns of the marks on the back surface side.

Another Modification

While the operation detection circuit 21 generates information corresponding to each operation based on the detection outputs of the sensors and the generated information is transmitted to the outside in the above-described examples, it is also possible to provide the information processing device, for performing the image deformation process on the object image, with the function of the operation detection circuit 21 and thereby configure the operation input device to directly transmit the sensor outputs to the information processing device.

While preferred embodiments of the present disclosure have been described using specific terms, such description is for illustrative purposes only, and it is to be understood that changes and variations may be made without departing from the spirit or scope of the following claims.

What is claimed is:
1. An input device, comprising:
an operation input panel having a front surface and a back surface, wherein the operation input panel, in operation, receives external forces on the front surface and the back surface as operation inputs and is elastically displaced by the external forces;
an outer frame that surrounds and supports the operation input panel;
a sensor provided on the outer frame, wherein the sensor, in operation, detects displacements of the operation panel caused by the external forces;
a signal transmission circuit which, in operation, transmits signals corresponding to the displacements detected by the sensor; and
an inner frame that is elastically displaceable, wherein:
a periphery of the operation input panel is configured to be at least partially engaged with the inner frame,
the sensor, in operation, detects the displacements of the operation input panel caused by the external forces by detecting elastic displacements of the inner frame,
the outer frame is not elastically deformable, and
the periphery of the operation input panel is at least partially attached to the outer frame.
2. The input device according to claim 1, wherein the sensor is a proximity sensor or a contact sensor.
3. The input device according to claim 1, wherein:
the sensor is a pressure sensor, and
the periphery of the operation input panel is at least partially attached to the pressure sensor in a state in which a pressure is applied to the inner frame.
4. The input device according to claim 1, wherein:
the inner frame has a polygonal shape, and
the sensor, in operation, detects a displacement of at least one of a plurality of sides of the polygonal shape.
5. The input device according to claim 1, wherein:
the inner frame has a polygonal shape,
the sensor includes a plurality of sensors provided at each side of at least two pairs of sides of the polygonal shape, among pairs of sides forming corners of the polygonal shape, and each of the sensors detects at least one of the corners of polygonal shape, and
the signal transmission circuit, in operation, detects a moving direction of the external forces on the operation input panel based on detection outputs of the sensors at each side of the at least two pairs of sides and includes corresponding detection results in the signals.
6. The input device according to claim 1, wherein the sensor includes a plurality of sensors provided at a plurality of positions along the periphery of the operation input panel.
7. The input device according to claim 6, wherein the signal transmission circuit, in operation, detects application positions of the external forces on the operation input panel based on outputs of the plurality of sensors, and includes detection results corresponding to the displacements in the signals.
8. The input device according to claim 6, wherein the signal transmission circuit, in operation, detects movements of the external forces on the operation input panel based on variations over time of outputs of the plurality of sensors and includes detection results corresponding to the displacements in the signals.
9. Then input device according to claim 1, wherein the sensor is provided on the operation input panel.
10. The input device according to claim 9, wherein the sensor is a strain sensor.

11. The input device according to claim 9, wherein:
the periphery of the operation input panel is at least partially attached and fixed to the outer frame.

12. The input device according to claim 1, wherein the sensor includes an image sensor and the displacements of the operation input panel are detected based on images captured by the image sensor.

13. The input device according to claim 12, wherein marks are formed on the operation input panel, and the images captured by the image sensor include the marks.

14. An input device comprising:
an operation input panel having a front surface and a back surface, wherein the operation input panel, in operation, receives external forces on the front surface and the back surface as operation inputs and is elastically displaced by the external forces;
an outer frame that surrounds and supports the operation input panel;
a sensor provided on the outer frame, wherein the sensor, in operation, detects displacements of the operation panel caused by the external forces;
a signal transmission circuit which, in operation, transmits signals corresponding to the displacements detected by the sensor; and
an inner frame that is elastically displaceable, wherein:
a periphery of the operation input panel is configured to be at least partially engaged with the inner frame,
the inner frame has an arc shape or a circular shape, and
the sensor includes a plurality of sensors provided along a periphery of the arc shape or the circular shape.

15. An image processing system comprising:
an input device that includes:
an input panel having a front surface and a back surface, wherein the operation input panel, in operation, receives external forces on the front surface and the back surface as operation inputs and is elastically displaced by the external forces;
an outer frame that surrounds and supports the operation input panel;
a sensor provided on the outer frame, wherein the sensor, in operation, detects displacements of the operation input panel caused by the external forces;
a signal transmission circuit which, in operation, transmits signals corresponding to the displacements detected by the sensor; and
an inner frame that is elastically displaceable, wherein:
a periphery of the operation input panel is configured to be at least partially engaged with the inner frame,
the sensor, in operation, detects the displacements of the operation input panel caused by the external forces by detecting elastic displacements of the inner frame,
the outer frame is not elastically deformable, and
the periphery of the operation input panel is at least partially attached to the outer frame; and
an image processor which, in operation, visually deforms an object image displayed on a display screen according to the signals transmitted from the input device.

16. The system according to claim 15, wherein the image processor, in operation, visually, three-dimensionally deforms the object image displayed on the display screen according to the signals transmitted from the input device.

* * * * *